(12) United States Patent
Wang et al.

(10) Patent No.: US 11,989,284 B2
(45) Date of Patent: May 21, 2024

(54) SERVICE API INVOKING METHOD AND RELATED APPARATUS

(71) Applicant: Huawei Technologies Co., Ltd., Shenzhen (CN)

(72) Inventors: Yong Wang, Shenzhen (CN); Kai Pan, Shanghai (CN); Cuili Ge, Beijing (CN); Jing Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 835 days.

(21) Appl. No.: 17/066,902

(22) Filed: Oct. 9, 2020

(65) Prior Publication Data

US 2021/0081527 A1    Mar. 18, 2021

Related U.S. Application Data

(63) Continuation of application No. PCT/CN2019/081861, filed on Apr. 9, 2019.

(30) Foreign Application Priority Data

Apr. 9, 2018 (CN) .......................... 201810312734.1

(51) Int. Cl.
    *G06F 21/54*       (2013.01)
    *G06F 9/54*        (2006.01)
               (Continued)

(52) U.S. Cl.
CPC .............. *G06F 21/54* (2013.01); *G06F 9/547* (2013.01); *G06F 21/51* (2013.01); *H04L 67/133* (2022.05)

(58) Field of Classification Search
CPC .......... G06F 21/54; G06F 9/547; G06F 21/51; G06F 21/629; G06F 8/65; G06F 9/451; G06F 9/54; H04L 67/133
See application file for complete search history.

(56) References Cited

U.S. PATENT DOCUMENTS

| | | | |
|---|---|---|---|
| 2003/0220107 A1 | 11/2003 | Lioy et al. | |
| 2005/0091576 A1* | 4/2005 | Relyea | G06F 9/451 |
| | | | 715/210 |

(Continued)

FOREIGN PATENT DOCUMENTS

| | | |
|---|---|---|
| CN | 103188344 A | 7/2013 |
| CN | 105634743 A | 6/2016 |

(Continued)

OTHER PUBLICATIONS

3GPP TS 33.122 V0.1.0, "3rd Generation Partnership Project; Technical Specification Group Services and System Aspects; Security Aspects of Common API Framework for 3GPP Northbound APIs (Release 15)," Jan. 2018, 14 Pages.

(Continued)

*Primary Examiner* — Mohammed Waliullah
(74) *Attorney, Agent, or Firm* — Conley Rose, P.C.

(57) ABSTRACT

A service application programming interface (API) invoking method where a security method applied to an API exposing function entity is updated from an original security method to a new security method, and where the security method of the API exposing function entity is used for communication between the API exposing function entity and an invoker. The method includes: obtaining, by the invoker, a new security method of the API exposing function entity; and sending, by the invoker, a first invoking request to the API exposing function entity using the new security method, where the first invoking request includes a name of a service API, and where the first invoking request is used to invoke the service API.

20 Claims, 8 Drawing Sheets

(51) Int. Cl.
*G06F 21/51* (2013.01)
*H04L 67/133* (2022.01)

(56) References Cited

U.S. PATENT DOCUMENTS

| | | | |
|---|---|---|---|
| 2005/0144463 | A1 | 6/2005 | Rossebo et al. |
| 2009/0235349 | A1 | 9/2009 | Lai et al. |
| 2017/0099292 | A1 | 4/2017 | Kelley et al. |
| 2017/0180400 | A1 | 6/2017 | Demov et al. |
| 2020/0267238 | A1* | 8/2020 | Gupta ............... G06F 21/44 |
| 2021/0144550 | A1* | 5/2021 | Ito ..................... H04W 12/06 |
| 2021/0320923 | A1* | 10/2021 | Xu .................... H04W 12/082 |

FOREIGN PATENT DOCUMENTS

| | | | | |
|---|---|---|---|---|
| CN | 106067886 | A | | 11/2016 |
| CN | 107026853 | A | | 8/2017 |
| EP | 1526450 | A2 | * 4/2005 | ............... G06F 8/10 |
| IN | 201741015554 | A | | 11/2018 |
| JP | 2005524255 | A | | 8/2005 |
| KR | 20040097290 | A | | 11/2004 |
| RU | 2308755 | C2 | | 10/2007 |
| RU | 2618946 | C1 | | 5/2017 |
| WO | 2005064429 | A1 | | 7/2005 |
| WO | 2018203663 | A1 | | 11/2018 |
| WO | WO-2018203663 | A1 | * 11/2018 | ............. G06F 9/547 |

OTHER PUBLICATIONS

3GPP TS 23.222 V15.1.0, "3rd Generation Partnership Project; Technical Specification Group Services and System Aspects; Functional architecture and information flows to support Common API Framework for 3GPP Northbound APIs; Stage 2 (Release 15)," Apr. 2018, 87 pages.

3GPP TS 33.401 V15.3.0, "3rd Generation Partnership Project; Technical Specification Group Services and System Aspects; 3GPP System Architecture Evolution (SAE); Security architecture (Release 15)," Mar. 2018, 163 pages.

Dowling, B., et al., "Modelling ciphersuite and version negotiation in the TLS protocol," Apr. 17, 2015, 18 pages.

"Web API security—Wikipedia," Dec. 18, 2017, XP055790748, 2 pages.

* cited by examiner

SERVICE API INVOKING METHOD AND RELATED APPARATUS

CROSS-REFERENCE TO RELATED APPLICATIONS

This application is a continuation of International Patent Application No. PCT/CN2019/081861, filed on Apr. 9, 2019, which claims priority to Chinese Patent Application No. 201810312734.1, filed on Apr. 9, 2018. The disclosures of the aforementioned applications are hereby incorporated by reference in their entireties.

TECHNICAL FIELD

This application relates to the field of communications technologies, and in particular, to a service API invoking method and a related apparatus.

BACKGROUND

The 3rd Generation Partnership Project (3GPP) defines a plurality of specifications related to a northbound application programming interface (API). To avoid repetition and inconsistency between different API specifications, the 3GPP considers developing a common API framework (CAPIF) that has common features applicable to all northbound APIs. Generally, the CAPIF is deployed in a carrier network.

FIG. 1 is a schematic diagram of a CAPIF-based architecture. The architecture shown in FIG. 1 mainly includes the following network elements.

API invoker: An API invoker is usually provided by a third-party application provider that has a service agreement with the carrier network.

Service API: A service API is an interface through which a service is provided for the API invoker.

CAPIF core function entity: A CAPIF core function entity is a central storage of all policies of the service API, and is a center of the API invoker and the service API for authentication and authorization.

CAPIF API: A CAPIF API is an interface using which a CAPIF core function entity entry is provided for the API invoker.

API exposing function (AEF) entity: An API exposing function entity is an entry for a service provider to open services to external systems. The API invoker can use, using the AEF entity, a service provided by the service provider.

API publishing function entity: An API publishing function entity may publish information about the service API to the CAPIF core function entity, such that the API invoker finds the information about the service API in the CAPIF core function entity.

API management function entity: An API management function entity manages the service API, for example, monitoring a status of the service API, and recording invocation information.

In FIG. 1, a public land mobile network (PLMN) trust domain represents an area trusted by a public land mobile network. An API provider domain represents an area in which an API provider is located.

A connection relationship between the foregoing network elements is as follows.

An interface between the API invoker outside the PLMN trust domain and the CAPIF core function entity is a CAPIF-1e interface, and an interface between the API invoker outside the PLMN trust domain and the AEF entity is a CAPIF-2e interface. An interface between the API invoker in the PLMN trust domain and the CAPIF core function entity is a CAPIF-1 interface, and an interface between the API invoker and the AEF entity is a CAPIF-2 interface. An interface between the CAPIF core function entity and the AEF entity is a CAPIF-3 interface, an interface between the CAPIF core function entity and the API publishing function entity is a CAPIF-4 interface, and an interface between the CAPIF core function entity and the API management function is a CAPIF-5 interface.

Currently, before the API invoker invokes the service API, the API invoker and the CAPIF core function entity negotiate a security method used between the API invoker and the AEF entity. Then, when invoking the service API, the API invoker invokes the service API from the AEF entity using the security method. However, a case in which the security method is updated is not considered in the existing method, if the security method is updated, but the API invoker still uses the original security method to invoke the service API, the service API cannot be successfully invoked.

SUMMARY

Embodiments of this application provide a service API invoking method and a related apparatus, to avoid a problem that a service API fails to be invoked because of mismatch of a security method.

According to a first aspect, an embodiment of this application provides a service API invoking method. A security method applied to an API exposing function entity is updated from an original security method to a new security method, and the security method of the API exposing function entity is used for communication between the API exposing function entity and an invoker. The method includes: obtaining, by the invoker, the new security method of the API exposing function entity; and sending, by the invoker, a first invoking request to the API exposing function entity using the new security method, where the first invoking request includes a name of a service API, and where the first invoking request is used to invoke the service API.

That the security method of the API exposing function entity is used for communication between the API exposing function entity and an invoker may include: The security method of the API exposing function entity is used for authentication, authorization, and protection between the API exposing function entity and the invoker.

According to the solution in this embodiment of this application, when the security method of the API exposing function entity is updated, the invoker may obtain the new security method of the API exposing function entity in time, and invoke the service API from the API exposing function entity using the new security method, to avoid a problem that the service API fails to be invoked because of mismatch of the security method.

In a possible design, the invoker may obtain the new security method of the API exposing function entity in the following manners: In a first manner, the invoker receives the new security method from a common API framework (CAPIF) core function entity. In a second manner, the invoker receives the new security method from the API exposing function entity.

In an example, when the first manner is used, before the invoker receives the new security method from the CAPIF core function entity, the invoker may further request the new security method from the CAPIF core function entity. For example, the invoker may send an obtaining request to the"

CAPIF core function entity, where the obtaining request is used to request the new security method.

In another example, when the second manner is used, before the invoker obtains the new security method of the API exposing function entity, the invoker may further send a security method negotiation request to the API exposing function entity, the security method negotiation request includes a list of security methods supported by the invoker, and the list of security methods includes the new security method. Correspondingly, the invoker may receive a security method negotiation response from the API exposing function entity, where the security method negotiation response includes the new security method.

In this design and the foregoing two examples of this design, before the invoker obtains the new security method of the API exposing function entity, the invoker may further: send a second invoking request to the API exposing function entity using the original security method, where the second invoking request is used to invoke the service API; and receive a response message of the second invoking request from the API exposing function entity, where the response message of the second invoking request includes a cause value, and where the cause value is used to indicate that the service API fails to be invoked because of mismatch of the security method.

In still another example, when the second manner is used, before the invoker receives the new security method from the API exposing function entity, the invoker may further send a third invoking request to the API exposing function entity using the original security method, where the third invoking request is used to invoke the service API. Correspondingly, the invoker may receive a response message of the third invoking request from the API exposing function entity, where the response message of the third invoking request includes the new security method and a cause value, and where the cause value is used to indicate that the service API fails to be invoked because of mismatch of the security method.

In a possible design, the invoker may further receive a response message of the first invoking request from the API exposing function entity, where the response message of the first invoking request is used to indicate that the service API is successfully invoked.

According to a second aspect, an embodiment of this application provides another service API invoking method. A security method applied to an API exposing function entity is updated from an original security method to a new security method, and the security method of the API exposing function entity is used for communication between the API exposing function entity and an invoker. The method includes: receiving, by a CAPIF core function entity, an update request for the API exposing function from an API publishing function entity, where the update request includes the new security method of the API exposing function; and storing, by the CAPIF core function entity, the new security method.

That the security method of the API exposing function entity is used for communication between the API exposing function entity and an invoker may include: The security method of the API exposing function entity is used for authentication, authorization, and protection between the API exposing function entity and the invoker.

In a possible design, the CAPIF core function entity may further send the new security method to the invoker.

In a possible design, the update request may further include indication information, where the indication information is used to instruct the CAPIF core function entity to send the new security method to the invoker.

In another possible design, before the CAPIF core function entity sends the new security method to the invoker, the CAPIF core function entity may further receive an obtaining request from the invoker, where the obtaining request is used to request the new security method.

In a possible design, the CAPIF core function entity may store a correspondence among the invoker, the new security method, and the API exposing function entity.

According to a third aspect, an embodiment of this application provides still another service API invoking method. A security method applied to an API exposing function entity is updated from an original security method to a new security method, and the security method of the API exposing function entity is used for communication between the API exposing function entity and an invoker. The method includes: receiving, by the API exposing function entity, a first invoking request sent by the invoker using the new security method, where the first invoking request includes a name of the service API, and where the first invoking request is used to invoke the service API; and verifying, by the API exposing function entity, the invoker using the new security method.

That the security method of the API exposing function entity is used for communication between the API exposing function entity and an invoker may include: The security method of the API exposing function entity is used for authentication, authorization, and protection between the API exposing function entity and the invoker.

In a possible design, before the API exposing function entity receives the first invoking request sent by the invoker using the new security method, the API exposing function entity may further send the new security method to the invoker.

In an example, before the API exposing function entity sends the new security method to the invoker, the API exposing function entity may further: receive a security method negotiation request from the invoker, where the security method negotiation request includes a list of security methods supported by the invoker, and where the list of security methods includes the new security method; and send a security method negotiation response to the invoker, where the security method negotiation response includes the new security method.

In a possible design, before the API exposing function entity sends the new security method to the invoker, the API exposing function entity may further receive a second invoking request sent by the invoker using the original security method, where the second invoking request is used to invoke the service API; and send a response message of the second invoking request to the invoker, where the response message of the second invoking request is used to indicate that the service API fails to be invoked.

In an example, the response message of the second invoking request includes a cause value, where the cause value is used to indicate that the service API fails to be invoked because of mismatch of the security method.

In a possible design, before the API exposing function entity sends the new security method to the invoker, the API exposing function entity may further receive a third invoking request sent by the invoker using the original security method, where the third invoking request is used to invoke the service API. Correspondingly, the API exposing function entity may send a response message of the third invoking request to the invoker, where the response message of the third invoking request includes the new security method of the API exposing function entity and a cause value, and where the cause value is used to indicate that the service API fails to be invoked because of mismatch of the security method.

In a possible design, the API exposing function entity may further send a response message of the first invoking request to the invoker, where the response message of the first invoking request is used to indicate that the service API is successfully invoked.

According to a fourth aspect, an embodiment of this application provides a service API invoking method. A security method applied to a service API is updated from an original security method to a new security method. The method includes: obtaining, by an invoker, the new security method of the service API; and sending, by the invoker, a first invoking request to an API exposing function entity using the new security method, where the first invoking request includes a name of the service API, and where the first invoking request is used to invoke the service API.

According to the solution in this embodiment of this application, when the security method of the service API is updated, the invoker may obtain the new security method of the service API in time, and invoke the service API from the API exposing function entity using the new security method, to avoid a problem that the service API fails to be invoked because of mismatch of the security method.

In a possible design, the invoker may obtain the new security method of the service API in the following manners: In a first manner, the invoker receives the new security method from a CAPIF core function entity. In a second manner: The invoker receives the new security method from the API exposing function entity.

In an example, when the first manner is used, before the invoker receives the new security method from the CAPIF core function entity, the invoker may further request the new security method from the CAPIF core function entity. For example, the invoker may send an obtaining request to the CAPIF core function entity, where the obtaining request is used to request the new security method.

In another example, when the second manner is used, before the invoker obtains the new security method of the service API, the invoker may further send a security method negotiation request to the API exposing function entity, where the security method negotiation request includes a list of security methods supported by the invoker, and where the list of security methods includes the new security method. Correspondingly, the invoker may receive a security method negotiation response from the API exposing function entity, where the security method negotiation response includes the new security method.

In this design and the foregoing two examples of this design, before the invoker obtains the new security method of the service API, the invoker may further: send a second invoking request to the API exposing function entity using the original security method, the second invoking request is used to invoke the service API; and receive a response message of the second invoking request from the API exposing function entity, where the response message of the second invoking request includes a cause value, and where the cause value is used to indicate that the service API fails to be invoked because of mismatch of the security method.

In still another example, when the second manner is used, before the invoker receives the new security method from the API exposing function entity, the invoker may further send a third invoking request to the API exposing function entity using the original security method, where the third invoking request is used to invoke the service API. Correspondingly, the invoker may receive a response message of the third invoking request from the API exposing function entity, where the response message of the third invoking request includes the new security method and a cause value, and where the cause value is used to indicate that the service API fails to be invoked because of mismatch of the security method.

In a possible design, the invoker may further receive a response message of the first invoking request from the API exposing function entity, where the response message of the first invoking request is used to indicate that the service API is successfully invoked.

According to a fifth aspect, an embodiment of this application provides another service API invoking method. A security method applied to a service API is updated from an original security method to a new security method. The method includes: receiving, by a CAPIF core function entity, an update request for the API exposing function from an API publishing function entity, where the update request includes the new security method of the service API; and storing, by the CAPIF core function entity, the new security method.

In a possible design, the CAPIF core function entity may further send the new security method to the invoker.

In a possible design, the update request may further include indication information, where the indication information is used to instruct the CAPIF core function entity to send the new security method to the invoker.

In another possible design, before the CAPIF core function entity sends the new security method to the invoker, the CAPIF core function entity may further receive an obtaining request from the invoker, where the obtaining request is used to request the new security method.

In a possible design, the CAPIF core function entity may store a correspondence among an identifier of the invoker, the new security method, and a name of the service API. For example, the CAPIF core function entity may store a correspondence among an identifier of the invoker, the new security method, a name of the service API, and the API exposing function entity.

According to a sixth aspect, an embodiment of this application provides still another service API invoking method. A security method applied to a service API is updated from an original security method to a new security method. The method includes: receiving, by an API exposing function entity, a first invoking request sent by an invoker using the new security method, where the first invoking request includes a name of the service API, and the first invoking request is used to invoke the service API; and verifying, by the API exposing function entity, the invoker using the new security method.

In a possible design, before the API exposing function entity receives the first invoking request sent by the invoker using the new security method, the API exposing function entity may further send the new security method to the invoker.

In an example, before the API exposing function entity sends the new security method to the invoker, the API exposing function entity may further: receive a security method negotiation request from the invoker, where the security method negotiation request includes a list of security methods supported by the invoker, and where the list of security methods includes the new security method; and send a security method negotiation response to the invoker, where the security method negotiation response includes the new security method.

In a possible design, before the API exposing function entity sends the new security method to the invoker, the API exposing function entity may further: receive a second invoking request sent by the invoker using the original security method, where the second invoking request is used to invoke the service API; and send a response message of the second invoking request to the invoker, where the response message of the second invoking request is used to indicate that the service API fails to be invoked.

In an example, the response message of the second invoking request includes a cause value, where the cause value is used to indicate that the service API fails to be invoked because of mismatch of the security method.

In a possible design, before the API exposing function entity sends the new security method to the invoker, the API exposing function entity may further receive a third invoking request sent by the invoker using the original security method, where the third invoking request is used to invoke the service API. Correspondingly, the API exposing function entity may send a response message of the third invoking request to the invoker, where the response message of the third invoking request includes the new security method of the API exposing function entity and a cause value, and where the cause value is used to indicate that the service API fails to be invoked because of mismatch of the security method.

In a possible design, the API exposing function entity may further send a response message of the first invoking request to the invoker, where the response message of the first invoking request is used to indicate that the service API is successfully invoked.

According to a seventh aspect, an embodiment of this application provides an apparatus. The apparatus has a function of implementing behavior of the invoker in the foregoing method design. The function may be implemented by hardware, or may be implemented by hardware executing corresponding software. The hardware or the software includes one or more modules corresponding to the foregoing function. For example, the apparatus may be an invoker, or may be a chip in an invoker.

In a possible design, the apparatus is an invoker, the invoker includes a processor, and the processor is configured to support the invoker in performing a corresponding function in the foregoing method. Further, the invoker may further include a communications interface, where the communications interface is configured to support communication between the invoker and a user plane entity of a centralized unit or communication between the invoker and another network element. Further, the invoker may further include a memory, where the memory is configured to couple to the processor, and where the memory stores a program instruction and data that are necessary for the invoker.

According to an eighth aspect, an embodiment of this application provides an apparatus. The apparatus has a function of implementing behavior of the CAPIF core function entity in the foregoing method design. The function may be implemented by hardware, or may be implemented by hardware executing corresponding software. The hardware or the software includes one or more modules corresponding to the foregoing function. For example, the apparatus may be a CAPIF core function entity, or may be a chip in a CAPIF core function entity.

In a possible design, the apparatus is a CAPIF core function entity, where the CAPIF core function entity includes a processor, and where the processor is configured to support the CAPIF core function entity in performing a corresponding function in the foregoing method. Further, the CAPIF core function entity may further include a communications interface, where the communications interface is configured to support communication between the CAPIF core function entity and a user plane entity of a centralized unit or communication between the CAPIF core function entity and another network element. Further, the CAPIF core function entity may further include a memory, where the memory is configured to couple to the processor, and where the memory stores a program instruction and data that are necessary for the CAPIF core function entity.

According to a ninth aspect, an embodiment of this application provides an apparatus. The apparatus has a function of implementing behavior of the API exposing function entity in the foregoing method design. The function may be implemented by hardware, or may be implemented by hardware executing corresponding software. The hardware or the software includes one or more modules corresponding to the foregoing function. For example, the apparatus may be an API exposing function entity, or may be a chip in an API exposing function entity.

In a possible design, the apparatus is an API exposing function entity, the API exposing function entity includes a processor, and the processor is configured to support the API exposing function entity in performing a corresponding function in the foregoing method. Further, the API exposing function entity may further include a communications interface, where the communications interface is configured to support communication between the API exposing function entity and a user plane entity of a centralized unit or communication between the API exposing function entity and another network element. Further, the API exposing function entity may further include a memory, where the memory is configured to couple to the processor, and where the memory stores a program instruction and data that are necessary for the API exposing function entity.

According to a tenth aspect, an embodiment of this application provides a communications system. The system includes the invoker and the API exposing function entity according to the foregoing aspects. Alternatively, the system includes the invoker, the API exposing function entity, and the CAPIF core function entity according to the foregoing aspects.

According to an eleventh aspect, an embodiment of this application provides a computer storage medium configured to store computer software instructions used by the invoker. The computer software instructions include a program designed for implementing behavior of the invoker in the first aspect or the fourth aspect.

According to a twelfth aspect, an embodiment of this application provides a computer storage medium configured to store computer software instructions used by the API exposing function entity. The computer software instructions include a program designed for implementing behavior of the API exposing function entity in the third aspect or the sixth aspect.

According to a thirteenth aspect, an embodiment of this application provides a computer storage medium configured to store computer software instructions used by the foregoing CAPIF core function entity. The computer software instructions include a program designed for implementing behavior of the foregoing CAPIF core function entity in the second aspect or the fourth aspect.

According to a fourteenth aspect, an embodiment of this application provides a chip system, applied to an invoker. The chip system includes at least one processor, a memory, and an interface circuit. The memory, the transceiver, and the at least one processor are interconnected using a line, and the memory stores an instruction. The instruction is executed by the at least one processor to perform an operation of the invoker in the foregoing method.

According to a fifteenth aspect, an embodiment of this application provides a chip system, applied to an API exposing function entity. The chip system includes at least one processor, a memory, and an interface circuit. The memory, the transceiver, and the at least one processor are interconnected using a line, and the at least one memory stores an instruction. The instruction is executed by the processor to perform an operation of the API exposing function entity in the foregoing method.

According to a sixteenth aspect, an embodiment of this application provides a chip system, applied to a CAPIF core function entity. The chip system includes at least one processor, a memory, and an interface circuit. The memory, the transceiver, and the at least one processor are interconnected using a line, and the at least one memory stores an instruction. The instruction is executed by the processor to perform an operation of the CAPIF core function entity in the foregoing method.

Compared with other approaches, in the solutions in the embodiments of this application, after the security method of the API exposing function entity is updated, the invoker can obtain the new security method of the API exposing function entity in time, and invoke the service API using the new security method, to avoid a problem that the service API fails to be invoked because of mismatch of the security method.

DESCRIPTION OF EMBODIMENTS

The following describes the technical solutions in embodiments of this application with reference to the accompanying drawings in the embodiments of this application.

Network architectures and application scenarios that are described in the embodiments of this application are intended to more clearly describe the technical solutions in the embodiments of this application, but are not intended to limit the technical solutions provided in the embodiments of this application. A person of ordinary skill in the art may know that as the network architectures evolve and a new application scenario emerges, the technical solutions provided in the embodiments of this application are also applicable to a similar technical problem.

Figure 1:
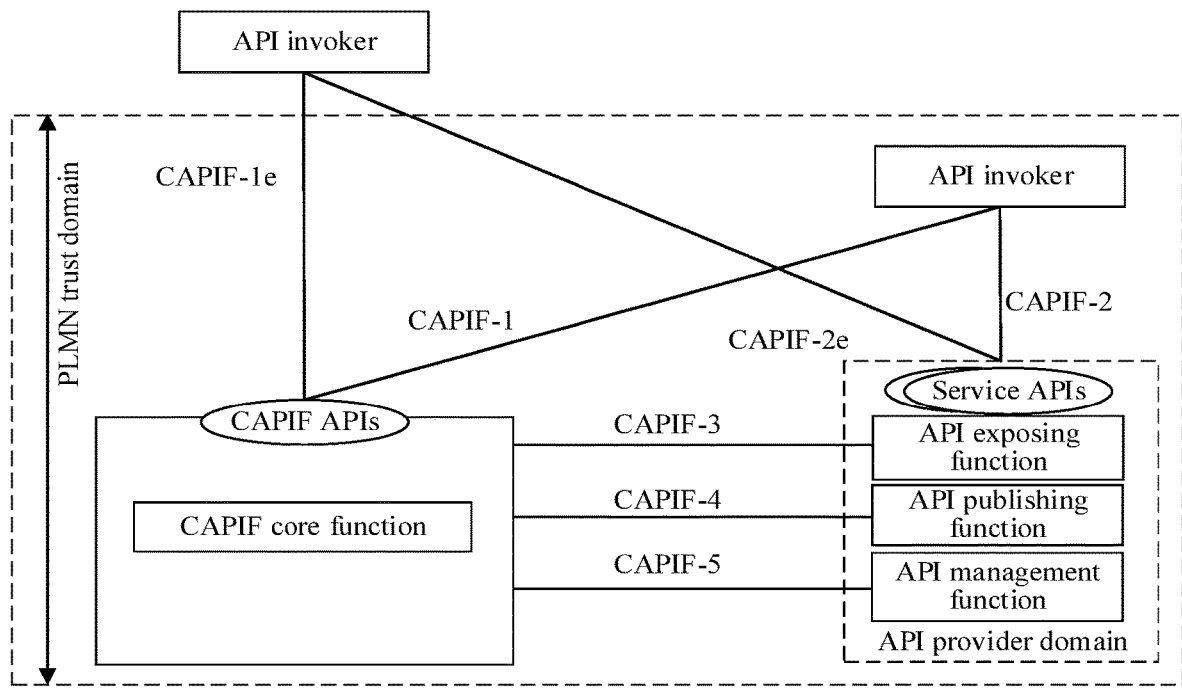
FIG. 1 is a schematic diagram of a CAPIF-based architecture according to an embodiment of this application.
Figure 2:
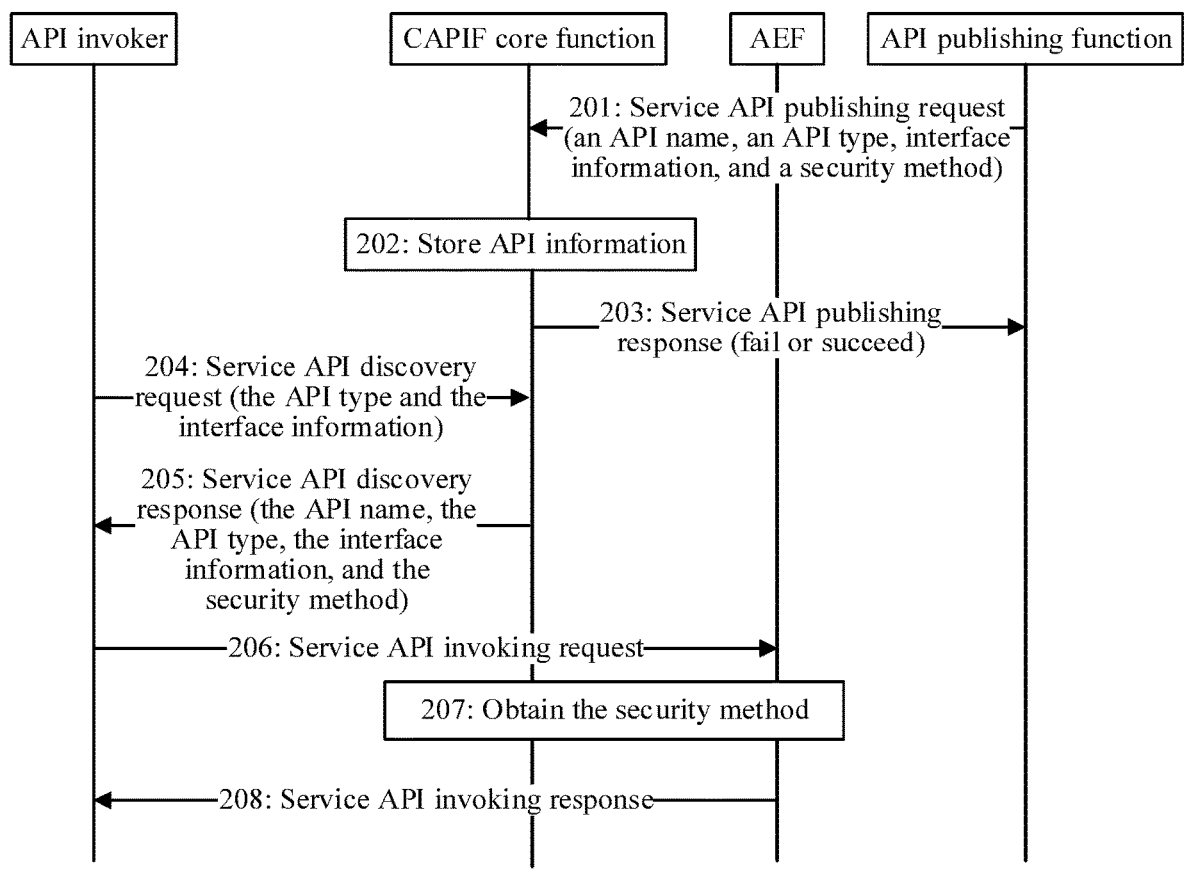
FIG. 2 is a schematic communication diagram of invoking an API.

The solutions in the embodiments of this application may be applied to the network architecture shown in FIG. 1. The network architecture is described in detail in the background, and details are not described herein again. Currently, in the network architecture shown in FIG. 1, an API is usually invoked using a procedure shown in FIG. 2. As shown in FIG. 2, the invoking process is as follows.

Step 201: An API publishing function sends a service API publishing request to a CAPIF core function, where the request carries API information. The API information may include an API name, an API type, interface information, a security method, and the like.

Step 202: The CAPIF core function stores the API information.

Step 203: The CAPIF core function sends a service API publishing response to the API publishing function.

If the CAPIF core function receives and stores the API information successfully, the CAPIF core function notifies, using the publishing response, the API publishing function that the API information is published successfully. If the CAPIF core function fails to receive the API information or fails to store the API information, the CAPIF core function notifies, using the publishing response, the API publishing function that the API information fails to be published.

Step 204: An API invoker sends a service API discovery request to the CAPIF core function, where the request carries the API type and the interface information.

The service API discovery request is used to query the API information.

Step 205: The CAPIF core function sends the service API discovery response to the API invoker, where the response carries the API information.

In addition, the CAPIF core function selects one security method and sends the security method to the API invoker. For example, the security method is a security method for a specific service API, and is used between the API invoker and an AEF. Alternatively, the security method may be a security method of an AEF, and is used between the API invoker and the AEF.

Step 206: The API invoker sends a service API invoking request to the AEF. The service API invoking request carries the API information.

It may be understood that, because a service provider opens a service to the API invoker using the service API on the AEF, the API invoker usually invokes the service API by sending a request to the AEF.

Step 207: The AEF obtains a security method corresponding to the API name and the interface information that are included in the API information.

For example, the AEF obtains, from the CAPIF core function, the security method corresponding to the API name and the interface information that are included in the API information.

Step 208: The AEF sends the service API invoking response to the API invoker.

For example, when the service API is invoked, the obtained security method is used for authentication, authorization, and protection between the API invoker and the AEF. If the authentication and authorization are successful, the API invoker sends an invoking response to the service API.

The preceding procedure is a procedure in which the API invoker invokes a service API the first time. The API invoker needs to first, from the CAPIF core function, find information about the service API and obtain the security method. After that, the API invoker can directly invoke the service API without needing to obtain the security method using the CAPIF core function any more.

However, in the foregoing invoking process, a case in which the security method of the API exposing function entity or the service API is updated is not considered. If the security method of the API exposing function entity or the service API is updated, but the API invoker still invokes the service API using the security method before update in step 206, the service API cannot be successfully invoked. Currently, no solution to this problem is provided in the industry.

In view of this, when the security method of the API exposing function entity or the service API is updated, the following embodiments of this application respectively provide corresponding invoking methods.

When a security method of an API exposing function entity is updated, an embodiment of this application provides a service API invoking method, and an invoker, a CAPIF core function entity, and an API exposing function entity that are based on the method. The following describes the service API invoking method with reference to FIG. 3A.

Figure 3A:
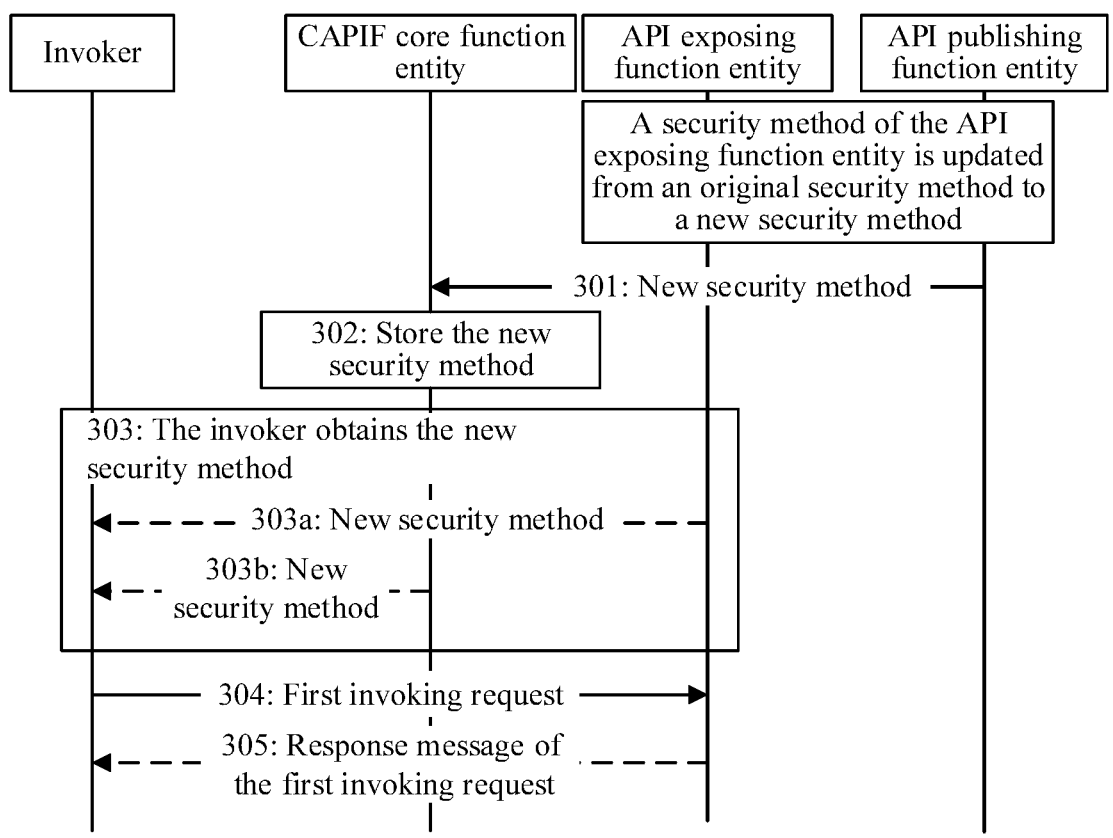
FIG. 3A is a schematic communication diagram of a service API invoking method according to an embodiment of this application.

FIG. 3A is a schematic communication diagram of a service API invoking method according to an embodiment of this application. A prerequisite for implementing the method shown in FIG. 3A is that a security method of an API exposing function entity is updated from an original security method to a new security method. The security method of the API exposing function entity is used for communication between the API exposing function entity and an invoker. For example, the security method of the API exposing function entity may be used for authentication, authorization, and protection between the API exposing function entity and the invoker. The method shown in FIG. 3A includes the following steps.

Step 301: A CAPIF core function entity receives an update request for the API exposing function from an API publishing function entity, where the update request includes the new security method of the API exposing function.

In an example, the update request further includes indication information, and the indication information is used to instruct the CAPIF core function entity to send the new security method to the invoker.

Step 302: The CAPIF core function entity stores the new security method.

In an example, the CAPIF core function entity stores a correspondence among the invoker, the new security method, and the API exposing function entity.

Step 303: The invoker obtains the new security method of the API exposing function entity.

In a first example, step 303 may be step 303*a*. The invoker receives the new security method from the API exposing function entity.

In a possible implementation, before performing step 303*a*, the invoker may further send a security method negotiation request to the API exposing function entity, where the security method negotiation request includes a list of security methods supported by the invoker, and the list of security methods includes the new security method. Correspondingly, step 303*a* may include: The invoker receives a security method negotiation response from the API exposing function entity, where the security method negotiation response includes the new security method.

In another possible implementation, before performing step 303*a*, the invoker may further send a third invoking request to the API exposing function entity using the original security method, where the third invoking request is used to invoke the service API. Correspondingly, step 303*a* may include: The invoker receives a response message of the third invoking request from the API exposing function entity, where the response message of the third invoking request includes the new security method and a cause value, and the cause value is used to indicate that the service API fails to be invoked because of mismatch of the security method.

In a second example, step 303 may be step 303*b*. The invoker receives the new security method from the CAPIF core function entity.

In a possible implementation, the CAPIF core function entity may send the new security method to the invoker based on the indication information in the update request.

In another possible implementation, before performing step 303*b*, the invoker may further request the new security method from the CAPIF core function entity. For example, the invoker may send an obtaining request to the CAPIF core function entity, where the obtaining request is used to request the new security method.

In a previous possible implementation of the first example in this step and the two implementations of the second example, before obtaining the new security method of the API exposing function entity, the invoker may further send a second invoking request to the API exposing function entity using the original security method, where the second invoking request is used to invoke the service API. The invoker may further receive a response message of the second invoking request from the API exposing function entity, where the response message of the second invoking request includes a cause value, and the cause value is used to indicate that the service API fails to be invoked because of mismatch of the security method.

Step 304: The invoker sends a first invoking request to the API exposing function entity using the new security method.

The first invoking request includes a name of the service API, and the first invoking request used to invoke the service API.

Optionally, the method shown in FIG. 3A may further include the following steps.

Step 305: The API exposing function entity sends a response message of the first invoking request to the invoker.

The response message of the first invoking request is used to indicate that the service API is successfully invoked.

In the method shown in FIG. 3A, when the security method of the API exposing function entity is updated, the invoker may obtain the new security method of the API exposing function entity in time, and invoke the service API from the API exposing function entity using the new security method, to avoid a problem that the service API fails to be invoked because of mismatch of the security method.

When a security method of a service API is updated, an embodiment of this application provides another service API invoking method, and an invoker, a CAPIF core function entity, and an API exposing function entity that are based on the method. The following describes the service API invoking method with reference to FIG. 3B.

Figure 3B:
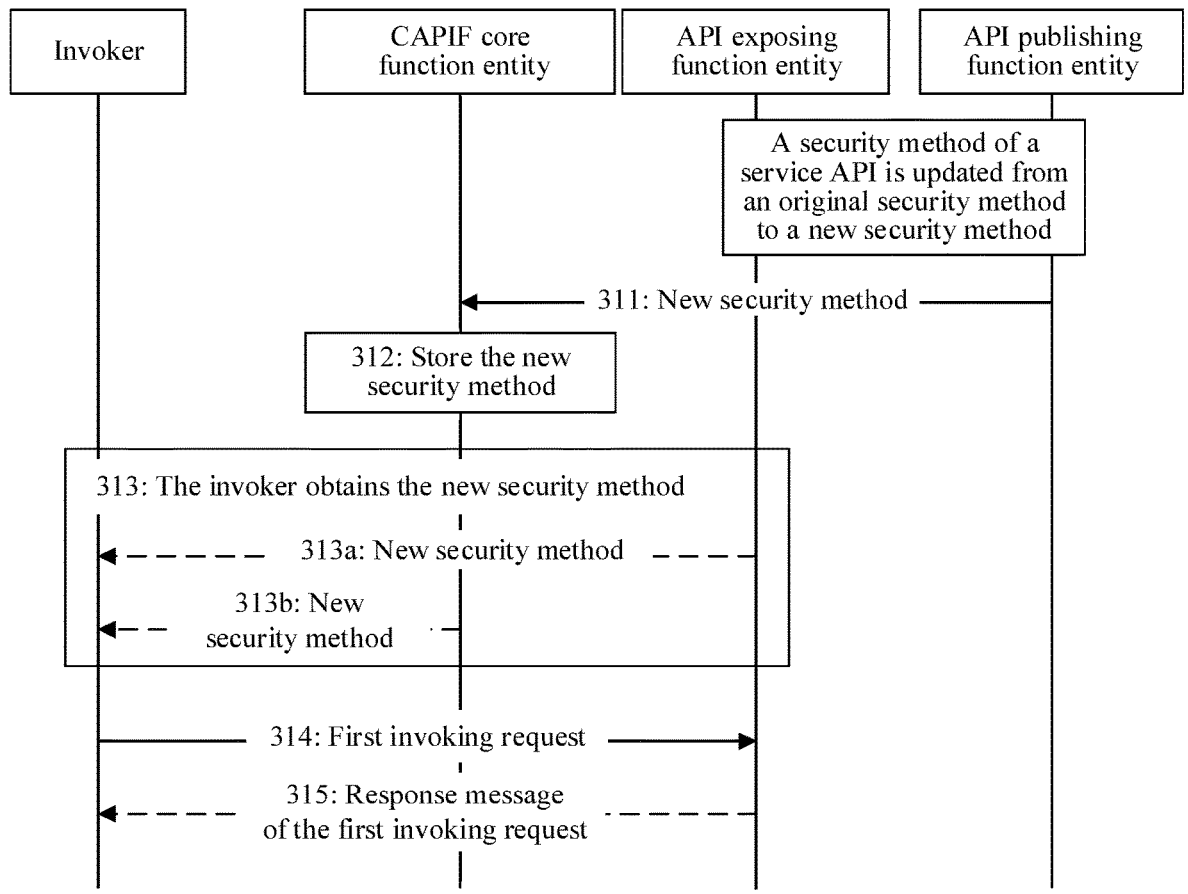
FIG. 3B is a schematic communication diagram of another service API invoking method according to an embodiment of this application.

FIG. 3B is a schematic communication diagram of another service API invoking method according to an embodiment of this application. A prerequisite for implementing the method shown in FIG. 3B is that a security method of a service API is updated from an original security method to a new security method. The method shown in FIG. 3B includes the following steps.

Step 311: A CAPIF core function entity receives an update request for an API exposing function from an API publishing function entity, where the update request includes the new security method of the service API.

In an example, the update request further includes indication information, and the indication information is used to instruct the CAPIF core function entity to send the new security method to an invoker.

Step 312: The CAPIF core function entity stores the new security method.

In an example, the CAPIF core function entity stores a correspondence among the invoker, the new security method, and the service API. In an example, the CAPIF core function entity stores a correspondence among the invoker, the new security method, the service API, and the API exposing function entity.

Step 313: The invoker obtains the new security method of the service API.

In a first example, step 313 may be step 313a. The invoker receives the new security method from the API exposing function entity.

In a possible implementation, before performing step 313a, the invoker may further send a security method negotiation request to the API exposing function entity, where the security method negotiation request includes a list of security methods supported by the invoker, and the list of security methods includes the new security method. Correspondingly, step 313a may include: The invoker receives a security method negotiation response from the API exposing function entity, where the security method negotiation response includes the new security method.

In another possible implementation, before performing step 313a, the invoker may further send a third invoking request to the API exposing function entity using the original security method, where the third invoking request is used to invoke the service API. Correspondingly, step 313a may include: The invoker receives a response message of the third invoking request from the API exposing function entity, where the response message of the third invoking request includes the new security method and a cause value, and the cause value is used to indicate that the service API fails to be invoked because of mismatch of the security method.

In a second example, step 313 may be step 313b. The invoker receives the new security method from the CAPIF core function entity.

In a possible implementation, the CAPIF core function entity may send the new security method to the invoker based on the indication information in the update request.

In another possible implementation, before performing step 313b, the invoker may further request the new security method from the CAPIF core function entity. For example, the invoker may send an obtaining request to the CAPIF core function entity, where the obtaining request is used to request the new security method.

In a previous possible implementation of the first example in this step and the two implementations of the second example, before obtaining the new security method of the service API, the invoker may further send a second invoking request to the API exposing function entity using the original security method, and the second invoking request is used to invoke the service API. The invoker may further receive a response message of the second invoking request from the API exposing function entity, where the response message of the second invoking request includes a cause value, and the cause value is used to indicate that the service API fails to be invoked because of mismatch of the security method.

Step 314: The invoker sends a first invoking request to the API exposing function entity using the new security method.

The first invoking request includes a name of the service API, and the first invoking request used to invoke the service API.

Optionally, the method shown in FIG. 3B may further include the following steps.

Step 315: The API exposing function entity sends a response message of the first invoking request to the invoker.

The response message of the first invoking request is used to indicate that the service API is successfully invoked.

In the method shown in FIG. 3B, when the security method of the service API is updated, the invoker may obtain the new security method of the service API in time, and invoke the service API from the API exposing function entity using the new security method, to avoid a problem that the service API fails to be invoked because of mismatch of the security method.

It should be noted that the methods shown in FIG. 3A and FIG. 3B may be performed separately or may be performed in combination. For example, when the security method of the API exposing function entity is updated, the method shown in FIG. 3A may be performed. When the security method of the service API is updated, the method shown in FIG. 3B may be performed. When the security methods of both the API exposing function entity and the service API are updated, the methods shown in FIG. 3A and FIG. 3B may be performed in combination. For example, step 301 may be performed in combination with step 311, step 302 may be performed in combination with step 312, and step 303 may be performed in combination with step 313, step 304 may be performed in combination with step 314, and step 305 may be performed in combination with step 315. Certainly, when the methods shown in FIG. 3A and FIG. 3B are performed in combination, there may be another implementation, which is not limited in this embodiment of this application.

The following further describes the solutions in the embodiments of this application with reference to FIG. 4 to FIG. 7. In methods shown in FIG. 4 to FIG. 7, for content that is the same as or similar to that of the method shown in FIG. 3, refer to the detailed description in FIG. 3A or FIG. 3B. Details are not described subsequently. It should be noted that, the methods shown in FIG. 4 to FIG. 7 are described using an example in which a security method of a service API is updated. In an actual operation, the methods shown in FIG. 4 to FIG. 7 may also be applied to a case in which a security method of an API exposing function entity is updated. In this case, the security method of the service API in the methods shown in FIG. 4 to FIG. 7 is replaced with the security method of the API exposing function entity. In addition, in the foregoing, the "original security method" may also be described as a "security method before update", and the two may be mutually used. The "new security method" may also be described as an "updated security method", and the two may be mutually used.

Figure 4:
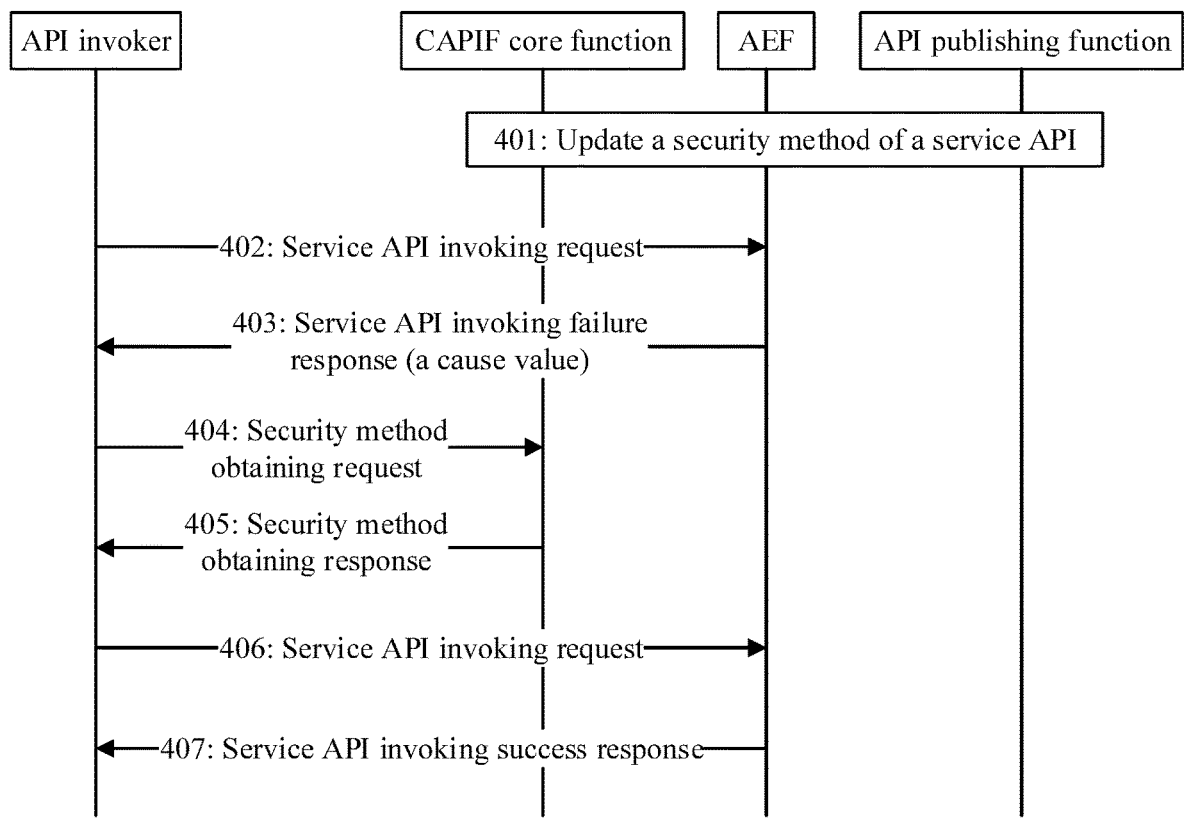
FIG. 4 is a schematic communication diagram of still another service API invoking method according to an embodiment of this application.

FIG. 4 is a schematic communication diagram of still another service API invoking method according to an embodiment of this application. An idea of the method shown in FIG. 4 is: After a security method of a service API is updated, if an API invoker fails to invoke the service API, the API invoker requests an updated security method of the service API from a CAPIF core function, and then invokes the service API from an AEF using the updated security method. The method shown in FIG. 4 may include step 401 to step 406.

It should be noted that, before the method shown in FIG. 4 is performed, the CAPIF core function stores a correspondence among an identifier of the API invoker, a security method before update, and an identifier of the service API.

Step 401: Update the security method of the service API.

An example in which a security method of a service API 1 is updated is used for description. After the security method of the service API 1 is updated, the service API 1 notifies the CAPIF core function of the updated security method of the service API 1. The service API 1 may send the updated security method of the service API 1 to the CAPIF core function using an API publishing function. Correspondingly, after receiving the updated security method of the service API 1, the CAPIF core function stores the updated security method.

When storing the updated security method of the service API 1, the CAPIF core function may store a correspondence among an identifier of the API invoker, the updated security method of the service API 1, and a name of the service API 1. For example, the CAPIF core function may replace the security method before update of the service API 1 in the previously stored correspondence among an identifier of the API invoker, the security method before update of the service API 1, and a name of the service API 1 with the updated security method of the service API 1.

For example, the API publishing function may send a service API publishing request to the CAPIF core function, where the request carries the name of the service API 1 and the updated security method. After receiving the request, the CAPIF core function replaces the locally stored security method corresponding to the name of the service API 1 with the received updated security method. Further, after successfully storing the updated security method, the CAPIF core function may further send a service API publishing response to the API publishing function.

Step 402: The API invoker sends a service API invoking request to the AEF.

Herein, the API invoker communicates with the AEF using the security method before update of the service API 1. For example, the API invoker may perform authentication, authorization, and protection with the AEF using the security method before update the service API 1.

The service API invoking request uses a request message corresponding to the security method before update, and the request message may carry the identifier of the API invoker. Further, the request message may further carry the name of the service API 1.

For example, the security method before update is Transport Layer Security (TLS) pre-shared key (PSK) ciphersuites (TLS-PSK). When this method is used, the invoking request sent by the API invoker to the service API is a client hello message, and the client hello message carries a pre-shared key. The API invoker performs authentication and establishes a security connection to the AEF using the pre-shared key, to invoke the service API 1.

Step 403: The AEF sends a service API invoking failure response to the API invoker.

The service API invoking failure response carries a cause value, and the cause value is used to indicate that the service API 1 fails to be invoked because of a security method error.

Further, the service API invoking failure response may further carry indication information, where the indication information is used to instruct the API invoker to obtain the updated security method of the service API 1 from the CAPIF core function.

Step 404: The API invoker sends a security method obtaining request to the CAPIF core function.

The security method obtaining request carries the identifier of the API invoker. Optionally, the security method obtaining request may further carry the name of the service API 1.

Step 405: The CAPIF core function sends a security method obtaining response to the API invoker.

The security method obtaining response carries the updated security method.

In an example, the CAPIF core function may search, based on the API invoker, for security methods of all service APIs corresponding to the API invoker, and send the security methods to the API invoker. The CAPIF core function sends names of one or more service APIs and corresponding groups of the security methods to the API invoker. For example, the corresponding groups may be represented as (service API 1, security method 1), (service API 2, security method 2), or the like.

Correspondingly, after the API invoker receives the security method obtaining response, the API invoker may learn, according to the security method obtaining response, that the updated security method of the service API 1 is the security method 1.

In another example, the CAPIF core function may search, based on the identifier of the API invoker and the name of the service API 1, for a security method that is uniquely corresponding to the identifier of the API invoker and the name of the service API 1, add the security method to the security method obtaining response, and send the security method obtaining response to the API invoker.

Step 406: The API invoker sends a service API invoking request to the AEF.

Herein, the API invoker communicates with the AEF using the updated security method of the service API 1.

The API invoker performs authentication, authorization, and protection with the AEF using the updated security method of the service API 1. For example, the service API invoking request carries authentication information and an identifier of the API invoker that are corresponding to the updated security method of the service API 1. Further, the invoking request may further carry the name of the service API 1.

For example, the updated security method of the service API 1 is a transport layer security pre-shared key ciphersuites (TLS-PKI) security method, authentication information corresponding to the updated security method of the service API 1 is a certificate that needs to be carried in the client hello message, and the API invoker sends the client hello message carrying the certificate to the AEF to invoke the service API 1.

Step 407: The AEF sends a service API invoking success response to the API invoker.

In an example, the AEF may obtain the updated security method of the service API 1 from the CAPIF core function, and perform, based on the updated security method, authentication and authorization verification on an invoking request sent by the API invoker. If the verification is successful, the AEF sends the service API invoking success response to the API invoker.

For example, the authentication information corresponding to the updated security method is a certificate that needs to be carried in the client hello message. If the AEF successfully performs authentication and authorization verification on the API invoker based on the TLS-PKI security method corresponding to the certificate, the service API is successfully invoked, and the AEF sends the service API invoking success response to the API invoker.

In another example, the updated security method of the service API 1 is used for authentication, authorization, and protection between the AEF and the API invoker. If the authentication and authorization are successful, the AEF sends a success response to the API invoker.

In another possible implementation of this embodiment, the security method obtaining request in step 404 may be replaced with a security method discovery request, and the security method obtaining response in step 405 may be replaced with a security method discovery response. It may be understood that the foregoing security method obtaining request and security method obtaining response may be replaced with a newly defined message. A message name is not limited in this embodiment of this application. Alternatively, the foregoing step 404 and step 405 may be replaced with a security negotiation process between the API invoker and the CAPIF core function.

For example, in the security negotiation process, the API invoker sends all security methods supported by the API invoker to the CAPIF core function, and the CAPIF core function compares the received security methods with the security methods supported by the API exposing function, and selects a security method according to a policy, and sends the security method to the API invoker for use between the API invoker and the API exposing function entity.

Figure 5:
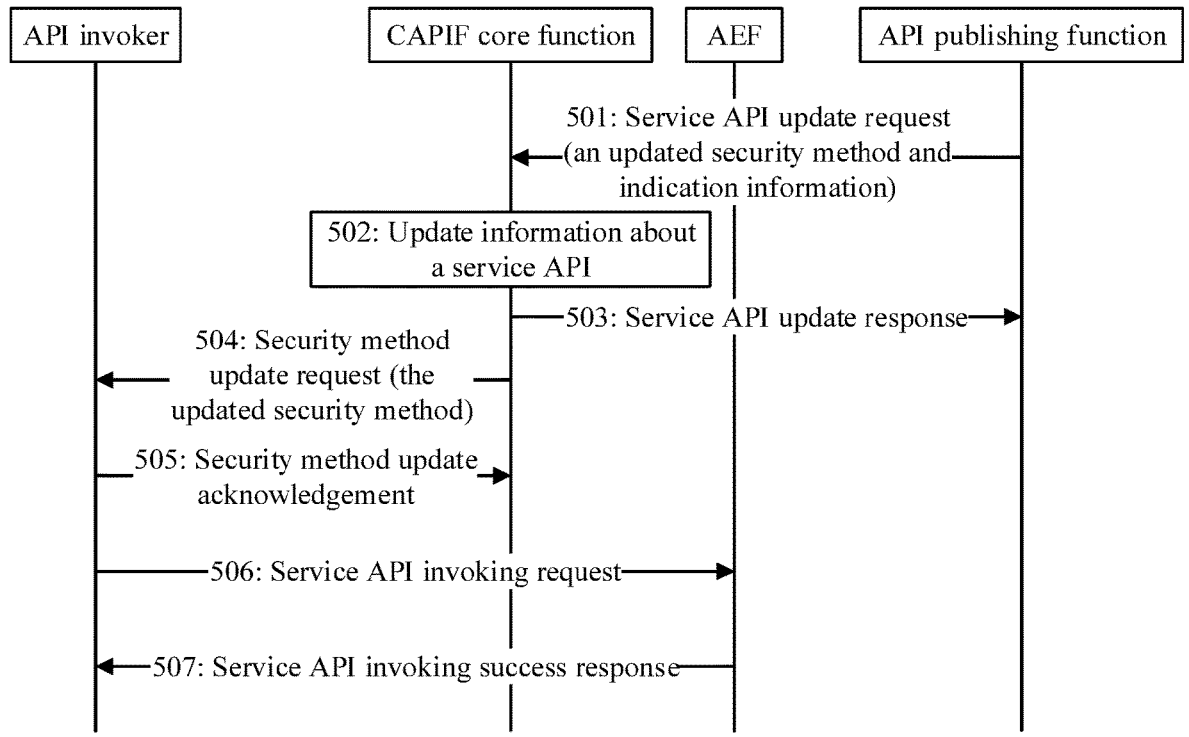
FIG. 5 is a schematic communication diagram of yet another service API invoking method according to an embodiment of this application.

FIG. 5 is a schematic communication diagram of still another service API invoking method according to an embodiment of this application. An idea of the method shown in FIG. 5 is: After a security method of a service API is updated, an API publishing function instructs a CAPIF core function to actively send the updated security method of the service API to an API invoker, and then the API invoker invokes the service API from an AEF using the updated security method. The method shown in FIG. 5 may include step 501 to step 507.

Step 501: The API publishing function sends a service API update request to the CAPIF core function.

The request carries a name of the service API, the updated security method, and indication information. The indication information is used to instruct the CAPIF core function to send the updated security method of the service API to the API invoker.

Step 502: The CAPIF core function updates information about the service API.

The CAPIF core function replaces a security method in the information about the service API stored in the CAPIF core function with the updated security method.

For example, the CAPIF core function originally stores a correspondence among an identifier of the API invoker, a security method before update of the service API, and the name of the service API. Herein, the CAPIF core function replaces the security method before update of the service API in the correspondence with the updated security method of the service API.

Step 503: The CAPIF core function sends a service API update response to the API publishing function.

Step 504: The CAPIF core function sends the updated information about the service API to the API invoker.

The updated information about the service API includes the name of the service API and the updated security method of the service API.

Step 505: The API invoker sends a security method update acknowledgment to the CAPIF core function.

Step 506 and step 507 are respectively the same as or similar to step 406 and step 407 in FIG. 4. For details, refer to the detailed description in FIG. 4. Details are not described herein again.

Figure 6:
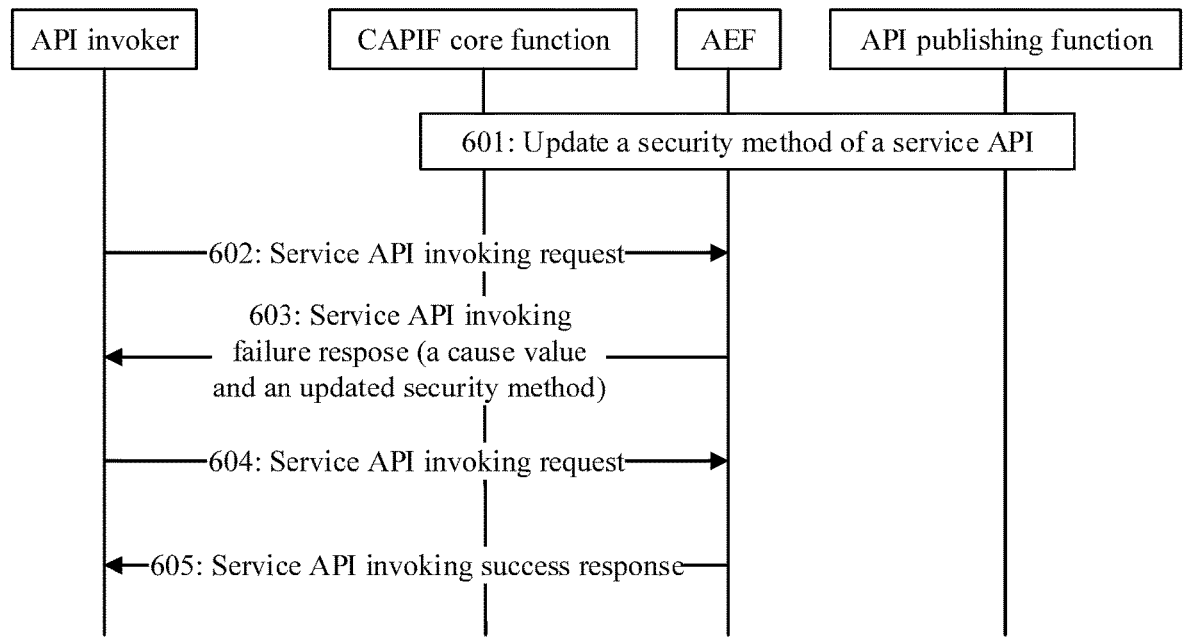
FIG. 6 is a schematic communication diagram of yet another service API invoking method according to an embodiment of this application.

FIG. 6 is a schematic communication diagram of yet another service API invoking method according to an embodiment of this application. An idea of the method shown in FIG. 6 is: After a security method of a service API is updated, when an API invoker fails to invoke the service API, an AEF sends the updated security method to the API invoker, and then the API invoker invokes the service API from the AEF using the updated security method. The method shown in FIG. 6 may include step 601 to step 605.

Step 601 and step 602 are respectively the same as step 401 and step 402 in FIG. 4. For details, refer to the detailed description in FIG. 4. Details are not described herein again.

Step 603: The AEF sends a service API invoking failure response to the API invoker.

The response carries a cause value and the updated security method. This cause value is used to indicate that the service API fails to be invoked because of a security method error.

Step 604 and step 605 are respectively the same as step 406 and step 407 in FIG. 4. For details, refer to the detailed description in FIG. 4. Details are not described herein again.

Figure 7:
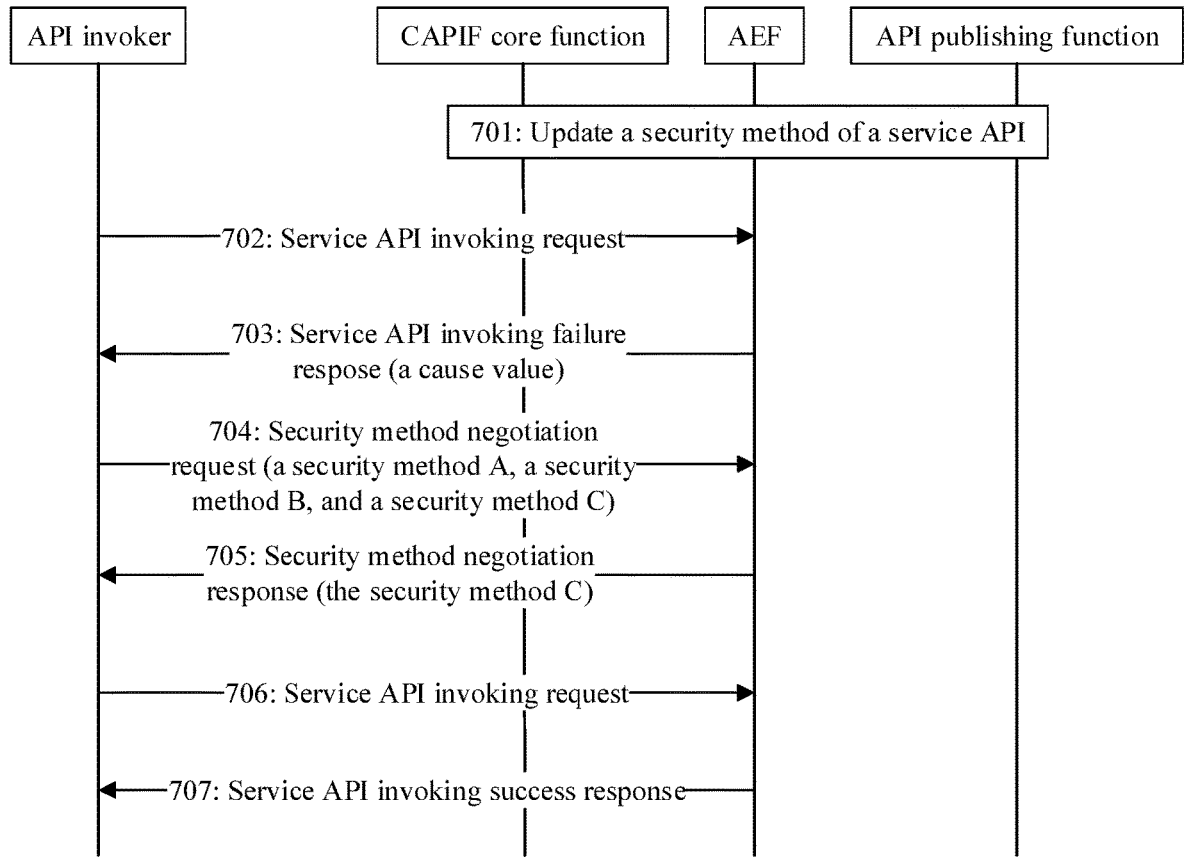
FIG. 7 is a schematic communication diagram of yet another service API invoking method according to an embodiment of this application.

FIG. 7 is a schematic communication diagram of yet another service API invoking method according to an embodiment of this application. An idea of the method shown in FIG. 7 is: After a security method of a service API is updated, when an API invoker fails to invoke the service API, the API invoker negotiates the security method with an AEF, and then the API invoker invokes the service API from the AEF using the negotiated security method. The method shown in FIG. 7 may include step 701 to step 706.

Step 701 to step 703 are respectively the same as or similar to step 401 to step 403 in FIG. 4. For details, refer to the detailed description in FIG. 4. Details are not described herein again.

Step 704: The API invoker sends a security method negotiation request to the AEF.

The request carries security methods supported by the API invoker, for example, including a security method A, a security method B, and a security method C.

It should be noted that in this embodiment of this application, it is assumed that a security method that may be used by the service API includes only the security method A, the security method B, and the security method C.

Step 705: The AEF sends a security method negotiation response to the API invoker.

The response carries the security method C. For example, after receiving the security method negotiation request, the AEF determines that the updated security method of the service API is the security method C, adds the security method C to the security method negotiation response, and sends the security method negotiation response to the API invoker.

Step 706: The API invoker sends a service API invoking request to the AEF.

Herein, the API invoker communicates with the AEF using the updated security method (that is, the security method C) of the service API.

Step 707: The AEF sends a service API invoking success response to the API invoker.

Implementation processes of step 706 and step 707 are similar to those of step 406 and step 407 in FIG. 4. For details, refer to the detailed description in FIG. 4. Details are not described herein again.

The solutions provided in the embodiments of this application are described above mainly from a perspective of interaction between the different network elements. It may be understood that, to implement the foregoing functions, the invoker, the API exposing function entity, and the CAPIF core function entity include a hardware structure and/or a software module corresponding to each function. With reference to the units and algorithm steps described in the embodiments disclosed in this application, the embodiments of this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation falls beyond the scope of the technical solutions in the embodiments of this application.

In the embodiments of this application, functional units of the invoker, the API exposing function entity, and the CAPIF core function entity may be divided according to the foregoing method examples. For example, each functional unit may be divided corresponding to each function, or two or more functions may be integrated into one processing unit. The integrated unit may be implemented in a form of hardware, or may be implemented in a form of a software functional unit. It should be noted that, in this embodiment of this application, unit division is an example, and is merely a logical function division. During actual implementation, another division manner may be used.

Figure 8:
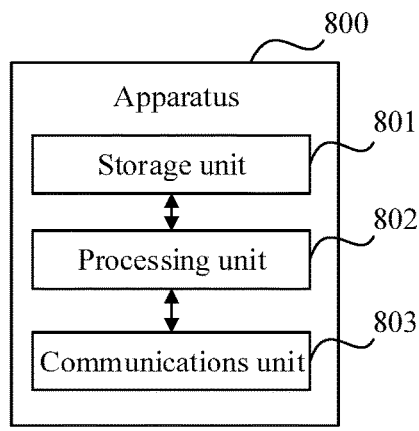
FIG. 8 is a schematic block diagram of an apparatus according to an embodiment of this application.

When the integrated unit is used, FIG. 8 is a possible example block diagram of an apparatus according to an embodiment of this application. The apparatus 800 may exist in a form of software, hardware, or a combination of software and hardware. FIG. 8 is a possible schematic block diagram of an apparatus according to an embodiment of this application. The apparatus 800 includes a processing unit 802 and a communications unit 803. The processing unit 802 is configured to control and manage behavior of the apparatus. The communications unit 803 is configured to support communication between the apparatus and another device. The apparatus may further include a storage unit 801 configured to store program code and data of the apparatus.

The apparatus 800 shown in FIG. 8 may be the invoker, the API exposing function entity, or the CAPIF core function entity in the embodiments of this application.

When the apparatus 800 shown in FIG. 8 is the invoker, the processing unit 802 can support the apparatus 800 in performing behavior completed by the invoker in the foregoing method examples. The communications unit 803 can support communication between the apparatus 800 and the CAPIF core function entity, communication between the apparatus 800 and the API exposing function entity, or the like. For example, the communications unit 803 supports the apparatus 800 in performing steps 303 to 305 in FIG. 3A, steps 313 to 315 in FIG. 3B, steps 402 to 407 in FIG. 4, steps 504 to 507 in FIG. 5, steps 602 to 605 in FIG. 6, steps 702 to 707 in FIG. 7, and/or another related communication process.

When the apparatus 800 shown in FIG. 8 is the API exposing function entity, the processing unit 802 can support the apparatus 800 in performing behavior completed by the API exposing function entity in the foregoing method examples. For example, the processing unit 802 supports the apparatus 800 in performing step 401 in FIG. 4, step 601 in FIG. 6, step 701 in FIG. 7, and/or another process of the technology described in this specification. The communications unit 803 can support communication between the apparatus 800 and the invoker, communication between the apparatus 800 and the CAPIF core function entity, or the like. For example, the communications unit 803 supports the apparatus 800 in performing steps 303*a*, 304, and 305 in FIG. 3A, and steps 313*a*, 314, and 315 in FIG. 3B, steps 402, 403, 406, and 407 in FIG. 4, steps 506 and 507 in FIG. 5, steps 602 to 605 in FIG. 6, steps 702 to 707 in FIG. 7, and/or another related communication process.

When the apparatus 800 shown in FIG. 8 is the CAPIF core function entity, the processing unit 802 can support the apparatus 800 in performing behavior completed by the CAPIF core function entity in the foregoing method examples. For example, the processing unit 802 supports the apparatus 800 in performing step 302 in FIG. 3A, step 312 in FIG. 3B, step 401 in FIG. 4, step 502 in FIG. 5, step 601 in FIG. 6, step 701 in FIG. 7, and/or another process of the technology described in this specification. The communications unit 803 can support communication between the apparatus 800 and the invoker, the API exposing function entity, the API publishing function entity, or the like. For example, the communications unit 803 supports the apparatus 800 in performing steps 301 and 303*b* in FIG. 3A, steps 311 and 313*b* in FIG. 3B, and steps 404 and 405 in FIG. 4, step 501 and steps 503 to 505 in FIG. 5, and/or another related communication process.

For example, the processing unit 802 may be a processor or a controller, for example, may be a central processing unit (CPU), a general-purpose processor, a digital signal processor (DSP), an application-specific integrated circuit (ASIC), a field programmable gate array (FPGA), or another programmable logic device, a transistor logic device, a hardware component, or a combination thereof. The processor may implement or execute various example logical blocks, units, and circuits described with reference to content disclosed in this application. Alternatively, the processor may be a combination for implementing a computing function, for example, a combination of one or more microprocessors, or a combination of the DSP and a microprocessor. The communications unit 803 may be a communications interface, and the communications interface is a general term. During implementation, the communications interface may include one or more interfaces. The storage unit 801 may be a memory.

Figure 9:
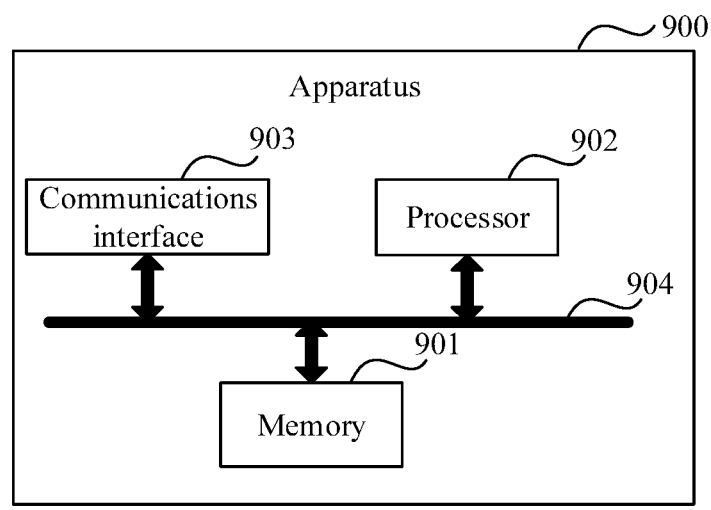
FIG. 9 is a schematic structural diagram of an apparatus according to an embodiment of this application.

When the processing unit 802 is a processor, the communications unit 803 is a communications interface, and the storage unit 801 is a memory, the apparatus in this embodiment of this application may be an apparatus 900 shown in FIG. 9.

Referring to FIG. 9, the apparatus 900 includes a processor 902 and a communications interface 903. Further, the apparatus 900 may further include a memory 901. Optionally, the apparatus 900 may further include a bus 904. The communications interface 903, the processor 902, and the memory 901 may be connected to each other using the bus 904. The bus 904 may be a peripheral component interconnect (PCI) bus, an extended industry standard architecture (EISA) bus, or the like. The bus 904 may be classified into an address bus, a data bus, a control bus, or the like. For ease of representation, only one thick line is used to represent the bus in FIG. 9, but this does not mean that there is only one bus or only one type of bus.

The processor 902 may perform various functions of the apparatus 900 by running or performing a program stored in the memory 901.

For example, the apparatus 900 shown in FIG. 9 may be the invoker, the CAPIF core function entity, or the API exposing function entity in the embodiments of this application.

When the apparatus 900 is the invoker, the processor 902 may perform behavior completed by the invoker in the foregoing method examples by running or performing the program stored in the memory 901. When the apparatus 900 is the CAPIF core function entity, the processor 902 may perform behavior completed by the CAPIF core function entity in the foregoing method examples by running or performing the program stored in the memory 901.

When the apparatus 900 is the API exposing function entity, the processor 902 may perform behavior of the API exposing function entity in the foregoing method examples by running or performing the program stored in the memory 901.

Methods or algorithm steps described in combination with the content disclosed in the embodiments of this application may be implemented by hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor such that the processor can read information from the storage medium or write information into the storage medium. Certainly, the storage medium may alternatively be a component of the processor. The processor and the storage medium may be located in the ASIC. In addition, the ASIC may be located in the invoker, the CAPIF core function entity, or the API exposing function entity. Certainly, the processor and the storage medium may alternatively exist in the invoker, the CAPIF core function entity, or the API exposing function entity as discrete components.

A person skilled in the art should be aware that in the foregoing one or more examples, functions described in the embodiments of this application may be implemented by hardware, software, firmware, or any combination thereof. When the functions are implemented by software, these functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any available medium accessible to a general-purpose or dedicated computer.

In the foregoing implementations, the objectives, technical solutions, and beneficial effects of the embodiments of this application are further described in detail. It should be understood that the foregoing descriptions are merely example implementations of the embodiments of this application, but are not intended to limit the protection scope of the embodiments of this application. Any modification, equivalent replacement, or improvement made based on the technical solutions of the embodiments of this application shall fall within the protection scope of the embodiments of this application.

What is claimed is:

1. A method, comprising:
sending, by an invoker, a first invoking request to an application programming interface (API) exposing function entity using an original security method, wherein the first invoking request is configured to invoke a service API;
receiving, by the API exposing function entity, the first invoking request from the invoker;
sending, by the API exposing function entity, a response message of the first invoking request to the invoker, wherein the response message comprises a cause value indicating that the service API failed to be invoked because of a security method error from a mismatch between the original security method of the invoker and a new security method of the API exposing function entity;
receiving, by the invoker, the response message from the API exposing function entity;
obtaining, by the invoker, the new security method of the API exposing function entity;
sending, by the invoker, a second invoking request to the API exposing function entity using the new security method, wherein the second invoking request comprises a name of the service API, and wherein the second invoking request is configured to invoke the service API; and
receiving, by the API exposing function entity, the second invoking request from the invoker.

2. The method of claim 1, wherein obtaining the new security method comprises receiving, by the invoker, the new security method from a common API framework (CAPIF) core function entity.

3. The method of claim 2, wherein before receiving the new security method, the method further comprises requesting, by the invoker, the new security method from the CAPIF core function entity.

4. The method of claim 1, wherein obtaining the new security method comprises receiving, by the invoker, the new security method from the API exposing function entity.

5. The method of claim 4, wherein before obtaining the new security method, the method further comprises sending, by the invoker, a security method negotiation request to the API exposing function entity, wherein the security method negotiation request comprises a list of security methods supported by the invoker, wherein the list of security methods comprises the new security method, wherein receiving the new security method comprises receiving, by the invoker, a security method negotiation response from the API exposing function entity, and wherein the security method negotiation response comprises the new security method.

6. The method of claim 1 further comprising receiving, by the invoker, a second response message of the second invoking request from the API exposing function entity, wherein the second response message indicates that the service API is successfully invoked.

7. The method of claim 1, further comprising verifying, by the API exposing function entity, the invoker using the new security method.

8. The method of claim 2, further comprising:
receiving, by the CAPIF core function entity, an update request for the API exposing function entity from an API publishing function entity, wherein the update request comprises the new security method; and storing, by the CAPIF core function entity, the new security method.

9. A system, comprising:
an invoker comprising:
a first memory configured to store first instructions; and
one or more first processors coupled to the first memory and configured to execute the first instructions to:
send a first invoking request to an application programming interface (API) exposing function entity using an original security method, the first invoking request is configured to invoke a service API;
receive a response message of the first invoking request from the API exposing function entity, wherein the response message comprises a cause value indicating that the service API failed to be invoked because of a security method error from a mismatch between the original security method of the invoker and a new security method of the API exposing function entity;
obtain the new security method of the API exposing function entity; and
send a second invoking request to the API exposing function entity using the new security method, wherein the second invoking request comprises a name of the service API, and wherein the second invoking request is configured to invoke the service API; and
the API exposing function entity comprising:
a second memory configured to store second instructions; and
one or more second processors coupled to the second memory and configured to execute the second instructions to:
receive the first invoking request from the invoker;
send the response message to the invoker; and
receive the second invoking request from the invoker.

10. The system of claim 9, wherein the one or more first processors are further configured to execute the first instructions to receive the new security method from a common API framework (CAPIF) core function entity.

11. The system of claim 10, wherein the one or more first processors are further configured to execute the first instructions to receive the new security method from the API exposing function entity.

12. The system of claim 11, wherein the one or more first processors are further configured to execute the first instructions to:
send a security method negotiation request to the API exposing function entity, wherein the security method negotiation request comprises a list of security methods supported by the invoker, and wherein the list of security methods comprises the new security method; and
receive a security method negotiation response from the API exposing function entity, wherein the security method negotiation response comprises the new security method.

13. The system of claim 9, wherein the one or more second processors are further configured to execute the second instructions to send a second response message of the second invoking request from the API exposing function entity, and wherein the second response message indicates that the service API is successfully invoked.

14. The system of claim 9, wherein the one or more second processors are further configured to execute the second instructions to verify the invoker using the new security method.

15. The system of claim 10, further comprising a common API framework (CAPIF) core function entity, wherein, the CAPIF core function entity is configured to:
receive an update request for the API exposing function entity from an API publishing function entity, wherein the update request comprises the new security method; and
store the new security method.

16. A method, comprising:
sending a first invoking request to an application programming interface (API) exposing function entity using an original security method, wherein the first invoking request is configured to invoke a service API;
receiving a response message of the first invoking request from the API exposing function entity, wherein the response message comprises a cause value indicating that the service API fails to be invoked because of a security method error from a mismatch between the original security method of an invoker and a new security method of the API exposing function entity;
obtaining the new security method of the API exposing function entity; and
sending a second invoking request to the API exposing function entity using the new security method, wherein the second invoking request comprises a name of the service API, and wherein the second invoking request is configured to invoke the service API.

17. The method of claim 16, wherein obtaining the new security method comprises receiving the new security method from a common API framework (CAPIF) core function entity.

18. The method of claim 17, wherein before receiving the new security method, the method further comprises requesting the new security method from the CAPIF core function entity.

19. The method of claim 16, wherein obtaining the new security method of an API exposing function entity comprises:
sending a security method negotiation request to the API exposing function entity, wherein the security method negotiation request comprises a list of security methods supported by the invoker, and wherein the list of security methods comprises the new security method; and
receiving a security method negotiation response from the API exposing function entity, wherein the security method negotiation response comprises the new security method.

20. The method of claim 16, further comprising receiving a second response message of the second invoking request from the API exposing function entity, wherein the second response message indicates that the service API is successfully invoked.

* * * * *

UNITED STATES PATENT AND TRADEMARK OFFICE
CERTIFICATE OF CORRECTION

PATENT NO. : 11,989,284 B2
APPLICATION NO. : 17/066902
DATED : May 21, 2024
INVENTOR(S) : Yong Wang et al.

It is certified that error appears in the above-identified patent and that said Letters Patent is hereby corrected as shown below:

In the Claims

Claim 9, Column 23, Line 12: "method, the first" should read "method, wherein the first"

Signed and Sealed this
Sixteenth Day of July, 2024

Katherine Kelly Vidal
*Director of the United States Patent and Trademark Office*